US012012702B1

(12) United States Patent
Williams

(10) Patent No.: US 12,012,702 B1
(45) Date of Patent: Jun. 18, 2024

(54) TRAFFIC ALERT SYSTEM AND METHOD HAVING INCREMENTAL SPEED BUMPS

(71) Applicant: James Williams, Sulphur, OK (US)

(72) Inventor: James Williams, Sulphur, OK (US)

( * ) Notice: Subject to any disclaimer, the term of this patent is extended or adjusted under 35 U.S.C. 154(b) by 0 days.

(21) Appl. No.: 18/442,197

(22) Filed: Feb. 15, 2024

(51) Int. Cl.
*E01F 9/529* (2016.01)
*G08G 1/0967* (2006.01)

(52) U.S. Cl.
CPC ........... *E01F 9/529* (2016.02); *G08G 1/0967* (2013.01)

(58) Field of Classification Search
CPC ....... E01F 9/529; G08G 1/0967; G08G 1/052; G08G 1/0116; G08G 1/0145; G08G 1/02
See application file for complete search history.

(56) References Cited

U.S. PATENT DOCUMENTS 4,974,991 A * 12/1990 Mandavi ................. E01F 9/529 404/11
5,267,808 A * 12/1993 Welford .................. E01F 9/529 404/11
6,174,103 B1 * 1/2001 Stroman ................... E01F 9/70 404/15
7,507,052 B2 * 3/2009 Griffiths .................. E01F 9/529 404/11
10,233,600 B2 * 3/2019 Janniello ................ G08G 1/052
11,453,986 B2 * 9/2022 Janniello .................. G08G 1/02
2008/0240856 A1 * 10/2008 Griffiths .................. E01F 9/529 404/15
2012/0282024 A1 * 11/2012 Hua ........................ E01F 9/529 404/15
2013/0209169 A1 * 8/2013 Chew ...................... E01F 9/529 404/15
2014/0227031 A1 * 8/2014 Fifi ......................... E01F 9/529 404/15
2018/0080186 A1 * 3/2018 Janniello ................. E01F 9/529
2019/0218729 A1 * 7/2019 Janniello .................. G08G 1/02
2020/0283975 A1 * 9/2020 Barnes ..................... E01F 9/529
2021/0140131 A1 * 5/2021 Janniello ................. E01F 9/529
2022/0228329 A1 * 7/2022 Janniello ................. E01F 9/529
2023/0392329 A1 * 12/2023 Barnes ..................... E01F 9/529
2024/0011230 A1 * 1/2024 Janniello ................. E01F 9/529

* cited by examiner

*Primary Examiner* — Hoi C Lau
(74) *Attorney, Agent, or Firm* — Dale J. Ream

(57) ABSTRACT

A system and method for notifying drivers of an emergency condition along a highway includes mounting a plurality of speed control assemblies in a ground surface beneath the highway, each identifier including a geographic component. This method includes selectively moving a speedbump portion between retracted and raised configurations a predetermined distance above the highway. Alert data including an alert location may be communicated from a traffic control agency to the traffic control assemblies. Using the plurality of identifiers, this method includes identifying respective speed control assemblies that are located within a predetermined distance upstream of the alert location and incrementally actuating the identified speed control assemblies to the raised configurations, respectively. Each incrementally raised configuration causes an increased impact with an associated sound and vibrational sensation to an automobile traveling upon the highway upstream of the alert location.

21 Claims, 11 Drawing Sheets

TRAFFIC ALERT SYSTEM AND METHOD HAVING INCREMENTAL SPEED BUMPS

BACKGROUND OF THE INVENTION

This invention relates generally to a traffic control system and, more particularly, to a highway alert system with three continuous speed bumps displaced from one another and that are raised incrementally so as to alert drivers regarding significant highway hazards that merit speed reduction.

Often called the Ripple Effect or the Domino Effect, the importance of notifying upstream traffic of the highway emergency cannot be overstated. In the vast network on inevitable occurrences. While emergency responders swiftly address the immediate crisis, a hidden danger looms in the form of potential traffic accidents and backups. The key to preventing a secondary disaster lies in the timely and effective notification of upstream traffic. Highways are dynamic ecosystems where the smooth flow of vehicles is crucial to prevent congestion and maintain safety. When an emergency condition or disaster unfolds, it disrupts this delicate balance. If the upstream traffic is not promptly notified, a domino effect can occur, leading to a chain reaction of accidents and gridlock. In the aftermath of an emergency on the highway, the potential for a secondary disaster caused by uninformed upstream traffic cannot be ignored. The implementation of robust notification systems and proactive measures is essential to break the chain reaction of accidents and congestion. By prioritizing communication and public awareness, we can pave the way for a safer and more resilient highway system, minimizing the impact of emergencies on our roadways.

One of the primary reasons for accidents in the wake of an emergency is the lack of awareness among upstream drivers. Without timely information, drivers are caught off guard, leading to abrupt stops, panic, and potential collisions. Another reason for accidents upstream of an emergency is that drivers have reduced reaction time to adapt to changing circumstances.

Several attempts have been made in the art to provide notice to upstream drivers, such as electronic signage, variable message boards, and real-time communication technologies to alert upstream traffic about an emergency ahead. Mobile apps that send a cellular signal or radio signals have been proposed. Although presumably effective for their intended purposes, there is still a need for an increasingly startling bump or jolt experienced by the driver of an automobile that will, without fail, cause the driver is slow the vehicle dramatically before encountering the emergency.

Therefore, it would be desirable to have a system and method for notifying automobile traffic of a downstream emergency condition along a specially equipped portion of a highway. It would also be desirable to have a system and method for notifying automobile traffic having a plurality of traffic speed assemblies mounted in a ground surface beneath a portion of the highway, each traffic speed assembly having a speedbump that is selectively raised incrementally to provide incremental notices to an automobile.

SUMMARY OF THE INVENTION

A system and method for notifying drivers of an emergency condition along a specially equipped highway includes mounting a plurality of speed control assemblies in a ground surface beneath the highway, each speed control assembly being identified by a respective one of a plurality of identifiers. Each identifier includes a geographic component. This method includes selectively moving a speedbump portion of each speed control assembly between a retracted configuration coplanar with the highway and a raised configuration a predetermined distance above the highway. The method includes receiving alert data regarding an alert location along the highway. The alert location, for instance, may include a collapsed bridge, a bridge under construction, a severe traffic accident, or any other emergency condition that may cause an even larger disaster if upstream traffic is not urged or caused to slow down.

Using the plurality of identifiers, this method includes identifying respective speed control assemblies that are located within a predetermined distance upstream of the alert location. Also, using a communications link, the method includes actuating the identified speed control assemblies to the raised configurations, respectively. In summary, the present method and system enables a traffic control agency such as a highway patrol agency to actuate traffic control assemblies to literally incrementally raise respective speed bumps above a normal highway surface so as to incrementally notify upstream traffic of their need to slow down approaching the emergency location.

Therefore, a general object of this invention is to provide a system and method for notifying automobile traffic of a downstream emergency situation along a specially equipped portion of a highway so as to control traffic speeds.

Another object of this invention is to provide a system and method for alerting automobile traffic of an emergency condition downstream along a highway, as aforesaid, that includes a plurality of traffic control assemblies mounted in a ground surface beneath a highway and spaced apart from one another.

Still another object of this invention is to provide a system and method for alerting automobile traffic of an emergency condition, as aforesaid, in which each speed control assembly includes a speedbump portion that is incrementally available between a retracted configuration planer with a highway service and a raised configuration extending upwardly a predetermined distance above the highway surface.

Yet another object of this invention is to provide a system and method for alerting automobile traffic of an emergency condition, as aforesaid, that includes contiguous speed control assemblies upstream of an emergency location that may be actuated to incrementally higher raised configurations that increasingly cause a decreased traffic speed.

Other objects and advantages of the present invention will become apparent from the following description taken in connection with the accompanying drawings, wherein is set forth by way of illustrations, examples, and embodiments of this invention.

DESCRIPTION OF THE PREFERRED EMBODIMENT

Figure 1:
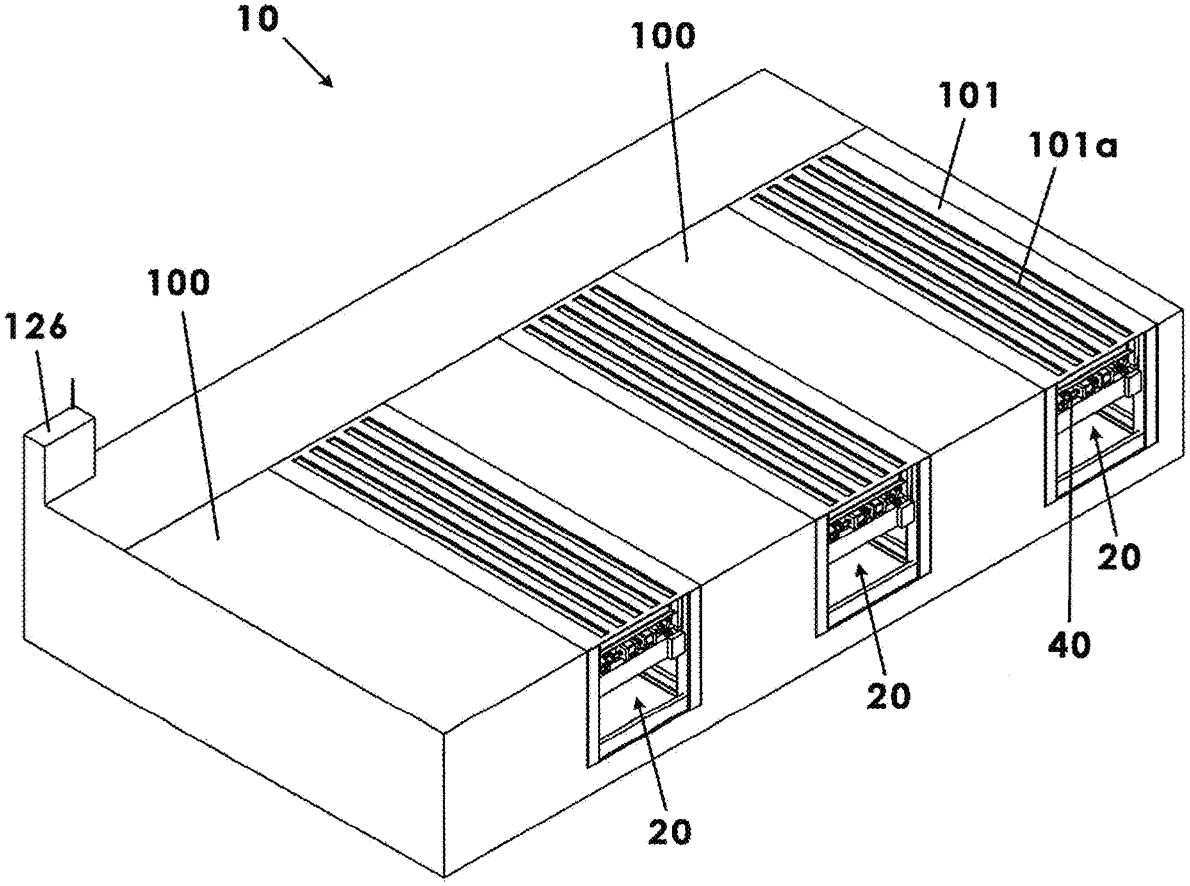
FIG. 1 is a perspective view of a system for alerting traffic of a downstream emergency according to a preferred embodiment of the present invention.
Figure 2:
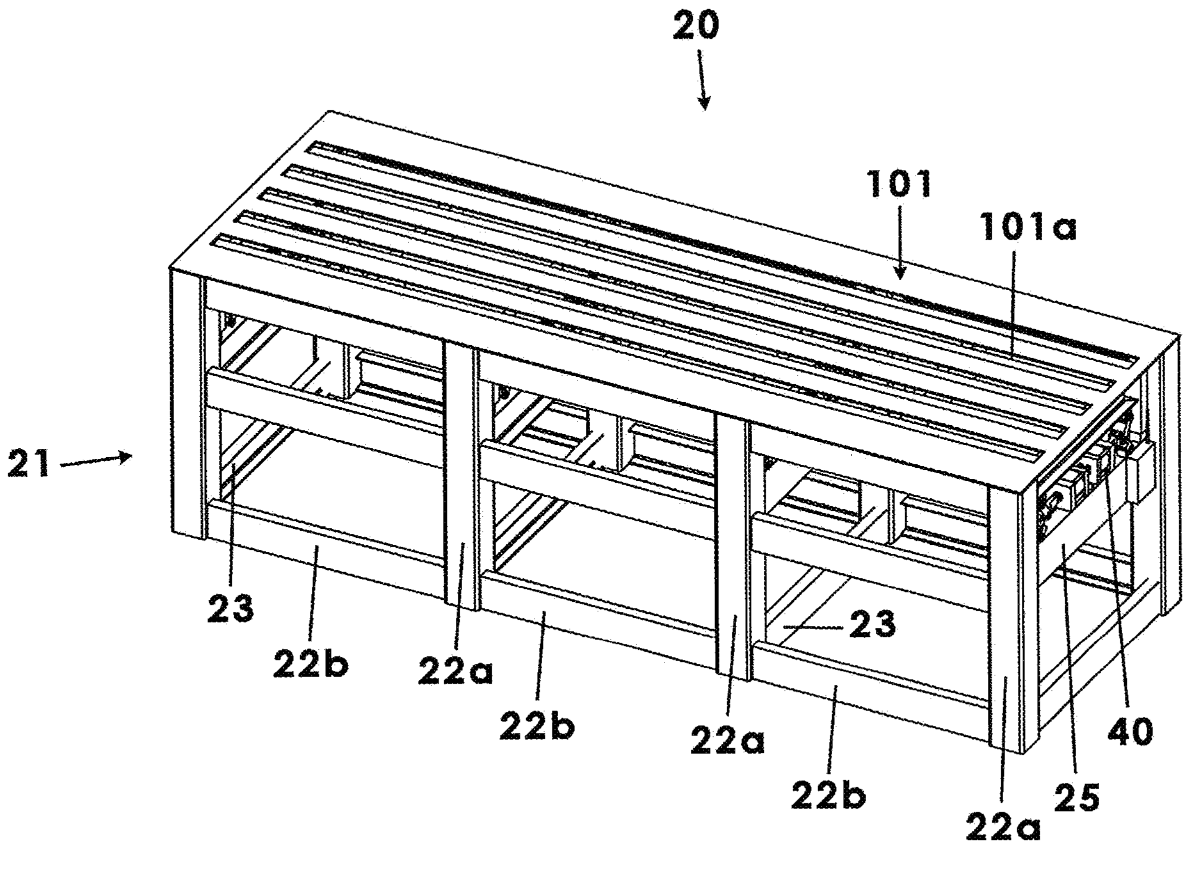
FIG. 2 is a perspective view of a speed control assembly taken from FIG. 1.

A system and method for notifying automobiles of an emergency condition along a highway according to a preferred embodiment of the present invention will now be described with reference to the accompanying drawings. More particularly, the system and method of the present invention includes a plurality of speed control assemblies 20 each located and mounted in a pit immediately beneath a roadway 100. It will be understood that the plurality of speed control assemblies may each be referred to as an elevation assembly in that each is functionally capable of being raised or elevated a predetermined amount above the road surface. It will also be understood that each speed control assembly may include an upper plate 101 that is constructed of or overlaid with the same material or material that is aesthetically similar to the material of the roadway 100 such that the upper plate may be perceived by drivers as being an actual part of the remainder of the roadway 100. As will be seen later, the upper plate 101 is actually a part of or integrated into the roadway and does not move but rather may define a plurality of slots 101*a* through which a speedbump portion 30 may extend when energized. Still further, although the plurality of speed control assemblies 20 may be illustrated adjacent or proximate one another in the present illustrations due to space considerations and for the sake of clarity, it is understood that the plurality of speed control assemblies 20 may actually be spaced apart longitudinally by a predetermined distance, such as at 1,000 feet intervals or the like (FIG. 1).

Figure 3:
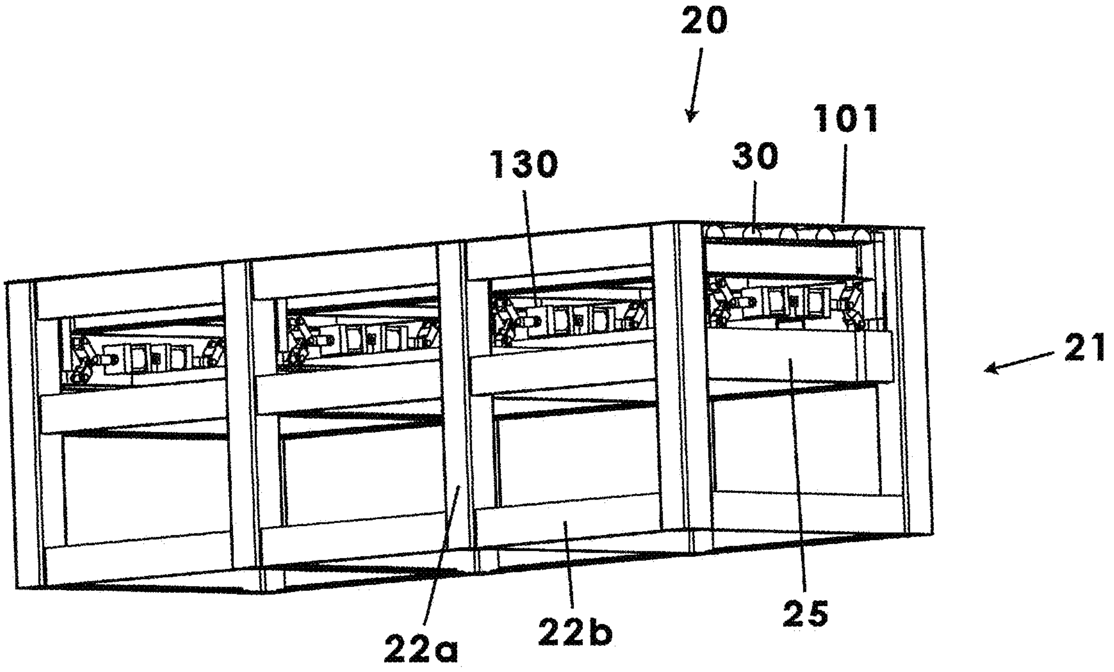
FIG. 3 is a perspective side view of the speed control assembly as in FIG. 2.

Each speed control assembly 20 (i.e., elevation assembly) may have a construction or assembly that is the same or substantially the same as every other elevation assembly although each may be independently actuated (i.e., raised) to a different predetermined elevation above the roadway 100 as will be described in greater detail later. Each speed control assembly 20 may include a structural framework 21 having a dimension complementary to dimensions of a pit or excavated hole in a ground surface that will later be covered by the roadway 100. In an embodiment, the structural framework 21 may include plurality of base members 22*b* that, together, define peripheral dimensions of the frame 21 and may include a plurality of posts 22*a* or stanchions that extend upwardly from the base members 22*b* and that are each spaced apart longitudinally from one another. A plurality of auxiliary base members 23 may extend laterally between lower ends of respective posts 22*a*. Further, the framework 21 may include a plurality of braces 25 extending laterally between respective post 22*a*, each brace 25 being parallel to and vertically displaced from a corresponding auxiliary base member 23. As will be seen later, functional elevation components 40 of a speed control assembly 20 (i.e., elevation assembly) may be mounted atop respective braces 25 and are configured to raise a corresponding speedbump portion 30. As seen in FIG. 3, each post 22*a* includes an upper end having a guide rail 22*c*, each guide rail 22*c* having an upstanding or vertical configuration parallel with a vertical axis defined by the post 22*a* from which it extends inwardly.

Figure 4:
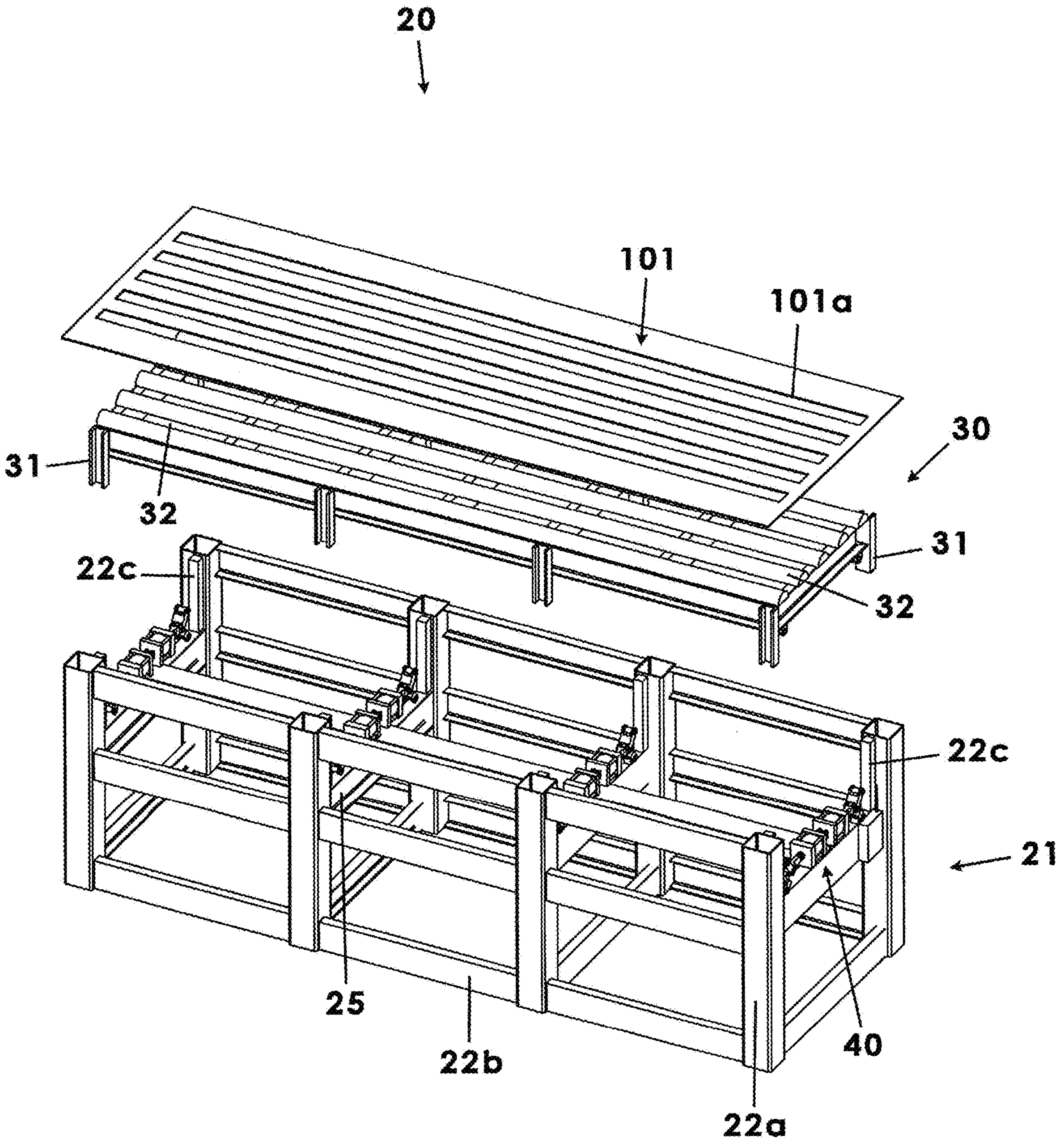
FIG. 4 is an exploded view of the traffic alert assembly as in FIG. 3.
Figure 5A:
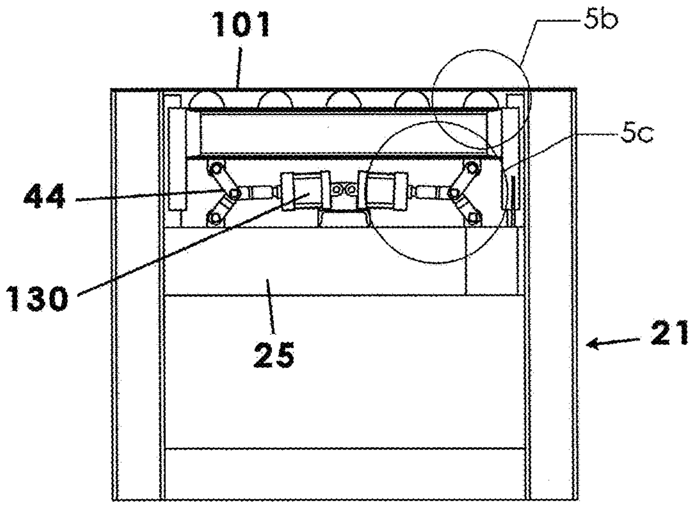
FIG. 5*a* is an end view of the speed control assembly as in FIG. 3.
Figure 5B:
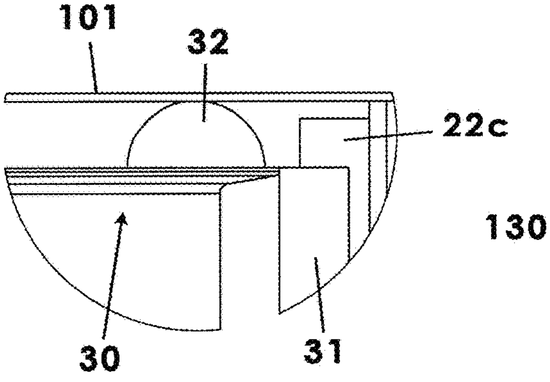
FIG. 5*b* is an isolated view on an enlarged scale taken from FIG. 5*a;*
Figure 5C:
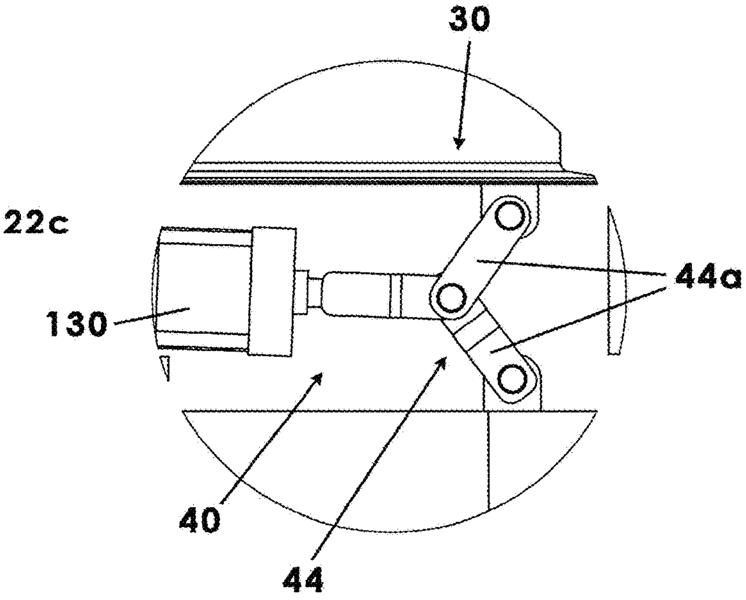
FIG. 5*c* is an isolated view on an enlarged scale taken from FIG. 5*a;*
Figure 6A:
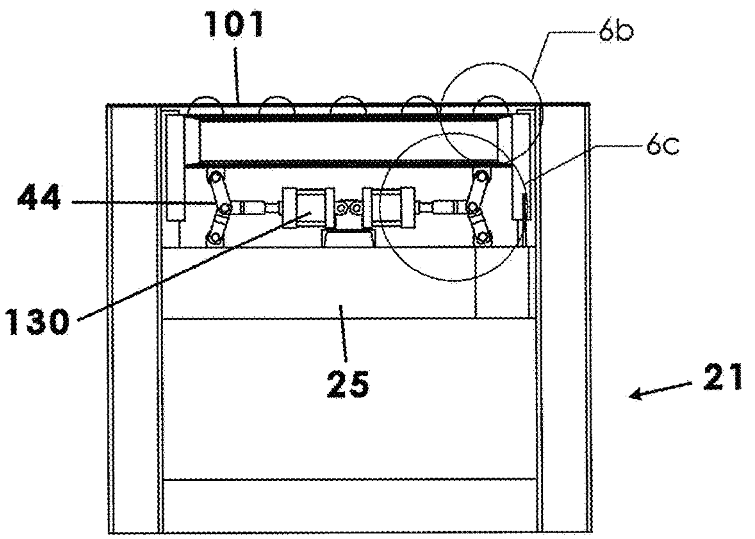
FIG. 6*a* is an end view of the speed control assembly as in FIG. 3.
Figure 6B:
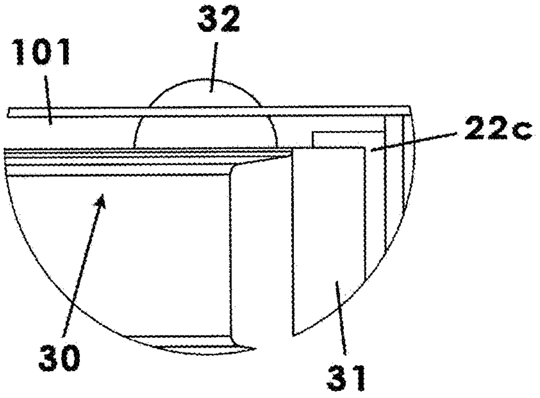
FIG. 6*b* is an isolated view on an enlarged scale taken from FIG. 6*a;*
Figure 6C:
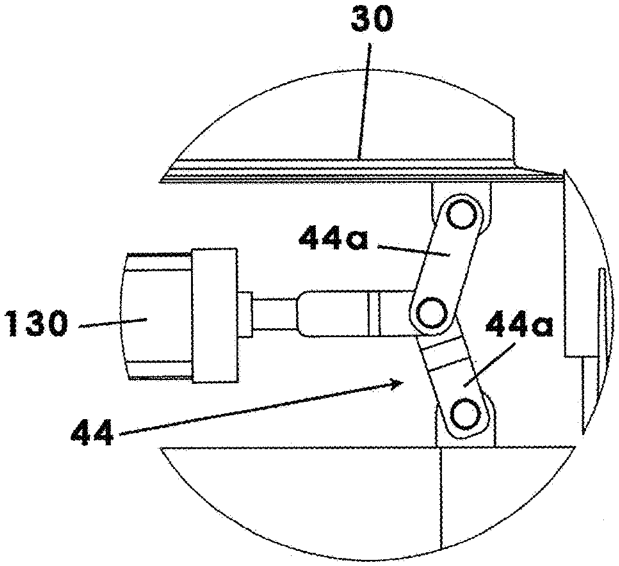
FIG. 6*c* is an isolated view on an enlarged scale taken from FIG. 6*a;*
Figure 7A:
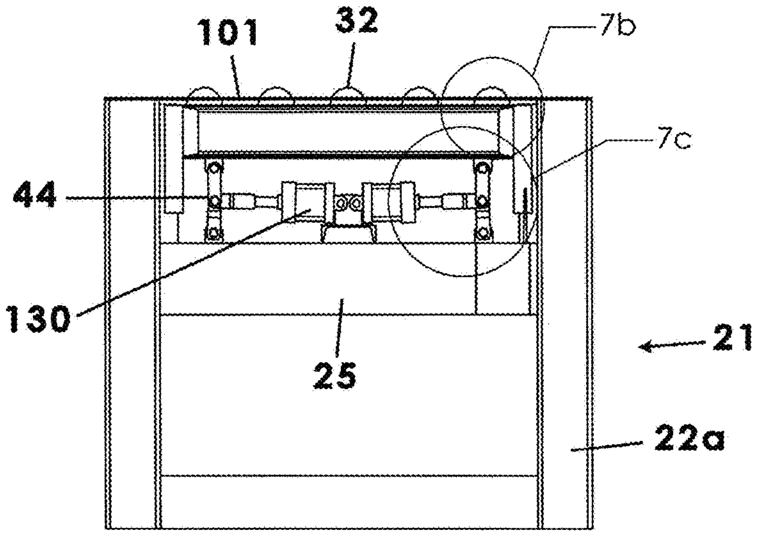
FIG. 7*a* is an end view of the speed control assembly as in FIG. 3.
Figure 7B:
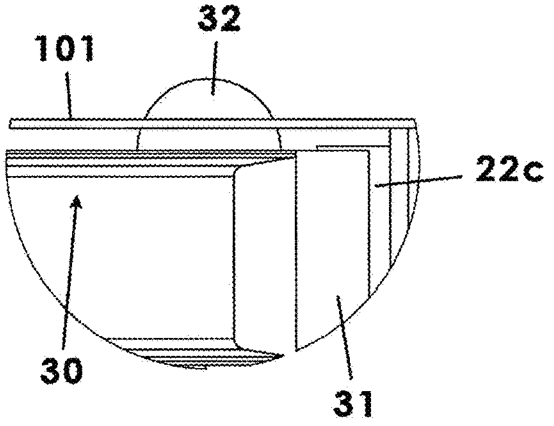
FIG. 7*b* is an isolated view on an enlarged scale taken from FIG. 7*a;*
Figure 7C:
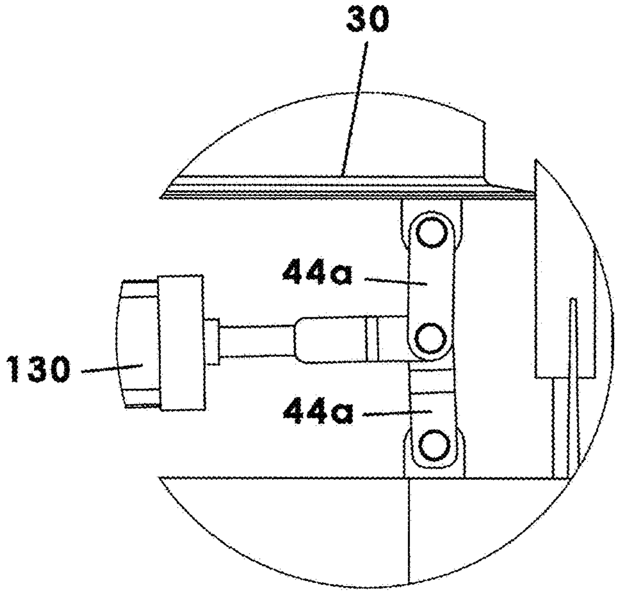
FIG. 7*c* is an isolated view on an enlarged scale taken from FIG. 7*a;*
Figure 8A:
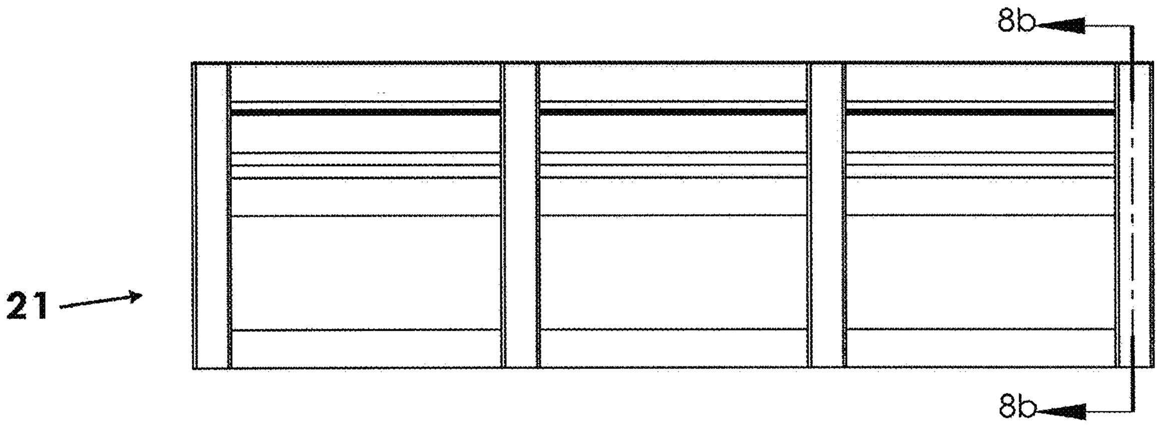
FIG. 8*a* is a side view of the speed control assembly as in FIG. 3.
Figure 8B:
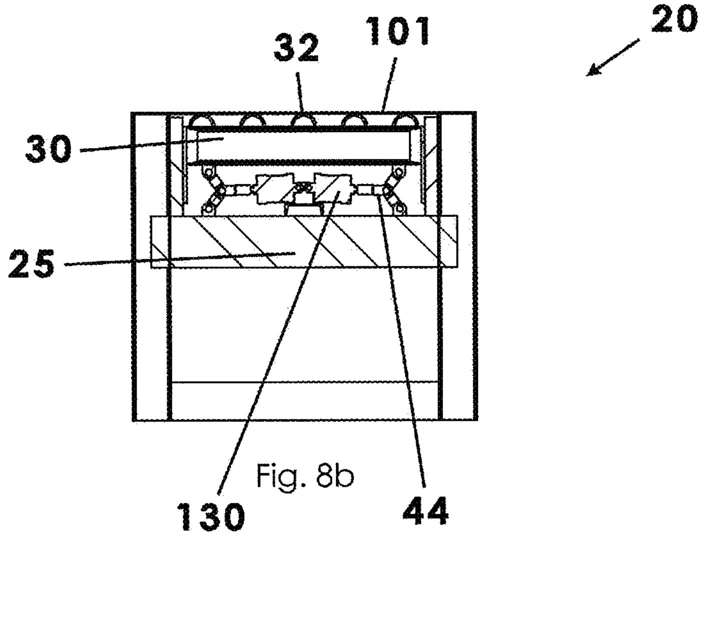
FIG. 8*b* is a sectional view taken along line 8*b*-8*b* of FIG. 8*a* illustrating a retracted configuration.
Figure 9A:
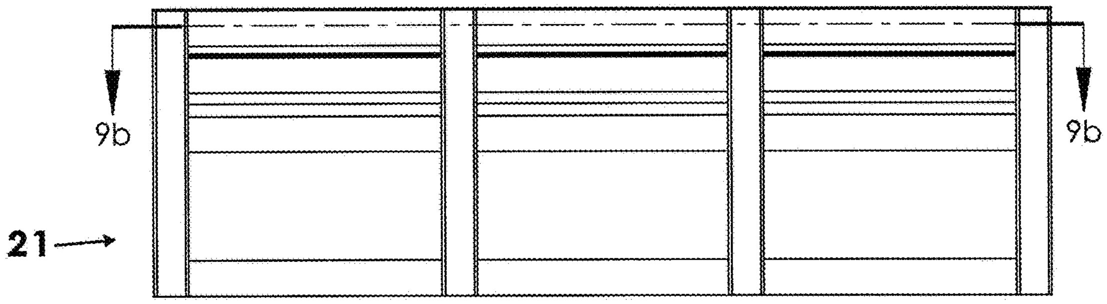
FIG. 9*a* is a side view of the speed control assembly as in FIG. 3.
Figure 9B:
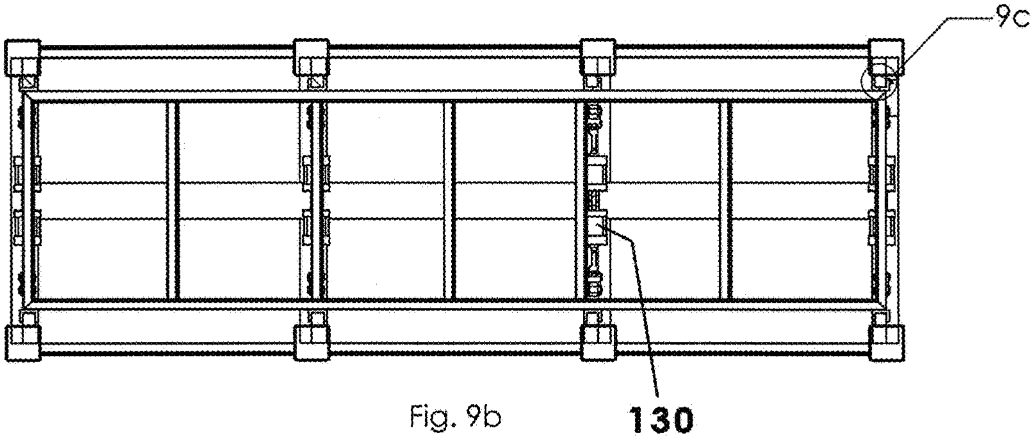
FIG. 9*b* is a sectional view taken along line 9*b*-9*b* of FIG. 9*a* illustrating a deployed configuration.
Figure 9C:
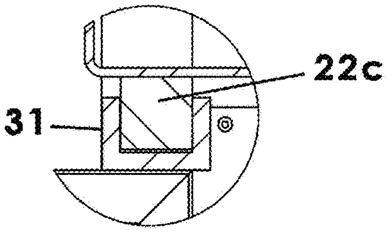
FIG. 9*c* is an isolated view on an enlarged scale taken from FIG. 9*c;*

As will be described below, each speed control assembly 20 includes a speedbump portion 30 (which may also be referred to as a speedbump elevation frame 30). As seen in FIG. 3, the guide portion 30 may have an elongate and generally rectangular configuration having a plurality of guide channels 31, each guide channel 31 having an upstanding configuration that defines a center groove that is complementary to and configured to slidably nest with a corresponding guide rail 22*c*. As will be described later, the speedbump portion 30 may be actuated to extend upwardly or downwardly by operation of the elevation components 40. This vertical movement is made possible as the plurality of guide channels 31 being slidably coupled to the plurality of guide rails 22*c* in a tongue and groove manner (FIG. 4). Stated another way, when the elevation components 40 are actuated, the speed bump portion 30 is pushed upwardly via the slidable interaction between respective guide rails 22*c* and guide channels 31.

In an embodiment, the speedbump portion 30 may include a plurality of durable frame members 32, each frame member 32 being constructed of iron or other composite material that is unbreakable by impact forces with the tires of automobiles. The plurality of frame members 32 may be positioned laterally adjacent one another and may, in some embodiments, have generally cylindrical configurations (FIG. 3). In an embodiment, the speedbump portion 30 includes the upper plate 101 described previously in which is in direct contact with the roadway 100. Specifically, the upper plate 101 has a configuration, such as a rectangular configuration, that is complementary to a configuration of the speedbump portion 30 and may be positioned coplanar with the roadway 100 immediately above the plurality of frame members 32. The upper plate 101 may define a plurality of slots 101*a* through which the plurality of frame members 32 may extend upwardly when the speedbump portion 30 is actuated and elevated as will be explained below. In other words, the speedbump portion 30 is movable between a retracted configuration displaced beneath the upper plate 101 and a deployed configuration in which the plurality of frame members 32 are raised upwardly and through the plurality of slots 101*a*, respectively. It is understood that physical contact or a "bump" is experienced by the driver of an automobile when a respective speed control assembly 20 is actuated and energized to the deployed configuration.

The means for actuating a respective speed control assembly 20 will now be discussed in detail. The elevation components 40 (which constitute the means for deployment) may include a linear actuator 42 and a linkage 44. It is understood that the linear actuator 42 may be energized by a direct connection to an electric power source, by a battery, or by operation of the motor (not shown and as would be understood by one of ordinary skill in the art). A linear actuator 42 has an actuator rod that extends outwardly when energized. More particularly, the actuator rod is configured to move between a retracted configuration and an extended configuration, the rod (unnumbered) being fixedly connected to the linkage shaft described below. As shown in FIGS. 5*a* through 7*c*, the linkage 44 may be referred to as a scissor-type linkage 44 having a pair of legs 44*a* pivotally coupled to a linkage shaft 44*b* which is then fixedly mounted to the rod of the linear actuator 42. Accordingly, the scissor linkage 44 may be positioned such that the legs 44*a* do not push upwardly on the speedbump portion at all (FIGS. 5*a* to 5*c*), push up on the speedbump portion 30 an intermediate amount (FIGS. 6*a* to 6*c*), or push up on the speedbump portion 30 a maximum amount (FIGS. 7*a* to 7*c*) as may be determined by operation of the linear actuator 42. In other words, each speed control assembly 20 (in a plurality of spaced apart speed control assemblies 20) may be individually energized to retracted, intermediate, or fully deployed configurations according to electronic control mechanisms that will be described below.

Figure 11:
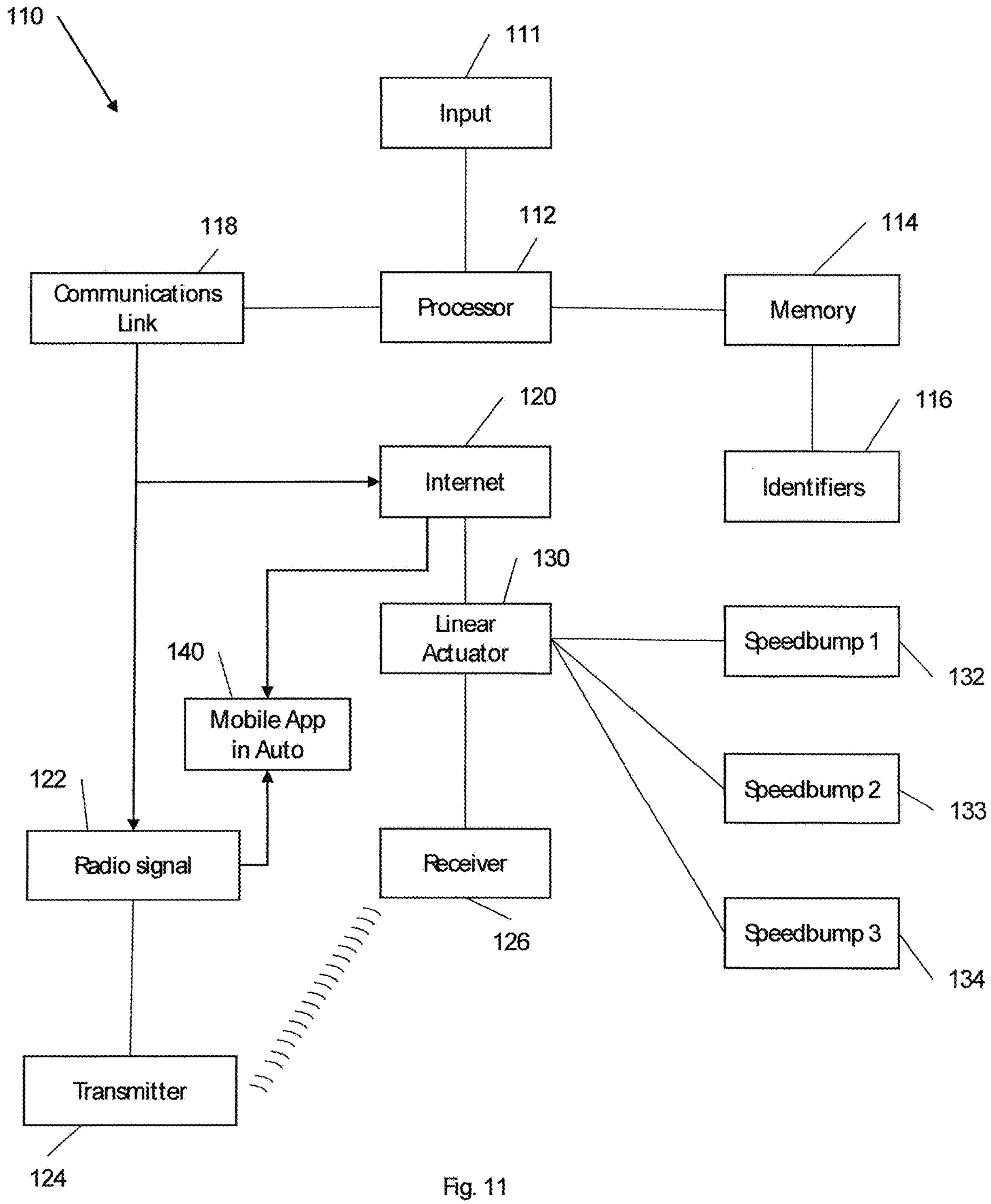
FIG. 11 is a block diagram illustrating the electronic components of the present invention.

Turning to FIG. 11, traffic control system 10 may include several electronic components 110—some of which may be operationally positioned adjacent to, hardwired to, or in signal communication with the plurality of speed control assemblies 20. By contrast, some components may be situated at the remote location and controlled by a traffic control agency, by law enforcement, or the like. Specifically, the present system 10 may include an electronic controller or, preferably, a central processing unit which will be referred to simply as a processor 112. Preferably, the processor 112 is the logic unit into which details regarding a downstream emergency may be entered, details regarding the geographic locations of respective speed control assemblies are recorded, and actuation signals are initiated. The processor 112 may be electrically connected to a non-volatile memory 114 that is configured to store data as well as programming instructions that may be executed by the processor 112. Specifically, the processor 112 is capable of determining at least one and preferably two or three speed control assemblies 20 that should be actuated such that respective corresponding speed bumps should be raised or deployed for the purpose of notifying automobiles that are approaching an emergency condition.

More particularly, a geographic location of each speed control assembly 20 may be entered and stored in the memory 114 at the time of installation. Stated another way, a respective speed control assembly 20 may be identified and distinguished from all other speed control assemblies and these distinguishing coordinates constitute a plurality of identifiers 116 stored in the memory 114. Further, the processor 112 may be electrically connected to an input device 111 such as a keyboard, scanner, USB device, or the like by which details of a traffic emergency may be entered, stored in a designated storage area in memory 114. For instance, a law enforcement agency may enter emergency conditions into the system.

In use, the processor 112 is configured to determine a predetermined number of speed control assemblies 20 that are closest to a geographic location of an emergency condition that has been entered into the system 10. In an embodiment, for instance, the processor 112 is capable of determining the three speed control assemblies 20 that are immediately upstream of the emergency condition. Then, the processor 112 is configured to actuate and energize the identified speed control assemblies to deploy respective speed bumps. The respective speed bump portions are referred to in FIG. 11 using reference characters 132, 133, and 134.

The means by which the processor 112 actuates the identified speed control assemblies will now be described in greater detail. In an embodiment, the processor 112 is in data communication with the plurality of speed control assemblies 20 via a communications link 118 (FIG. 11). Generically, the communications link 118 may describe a hardwired arrangement which would be characterized by the processor 112 and related computer equipment being located in a control box or control building located immediately adjacent the roadway 100 (not shown). In this instance, a human person would be tasked with physically entering the control building, entering the details of an emergency condition, and initiating respective speed bumps. This implementation might be appropriate when emergency condition is known in advance of its occurrence, such as when a bridge will be intentionally demolished or built as a matter of public planning. In another embodiment, however, the communications link 118 may involve the delivery of actuation signals delivered over a network such as the internet 120. Internet connections may include fiber-optic cabling between the processor 112 and plurality of speed control assemblies 24 may involve satellites and internet hotspots via cellular signals. In another embodiment, the communications link 118 may involve the transmission of respective signals using radio signals or radio waves. More particularly, the processor 112 may be in electrical and data communication with a traditional transmitter 124 that is configured to transmit initiation signals from a remote location to a traditional receiver 126 located at the site of each speed control assembly 20. Each receiver 126, then, is electrically connected to a respective linear actuator 42.

As described above, the actuation components 40 include one or more linear actuators 42. In fact, respective linear actuators 42 may be mounted in a back-to-back configuration so that opposite longitudinal side edges of a respective speedbump portion 30 may be raised equally. In another embodiment (not shown), each linear actuator 42 and linkage 44 may extend in only one direction such that only a leading edge of a prospective speedbump portion is raised.

Figure 10:
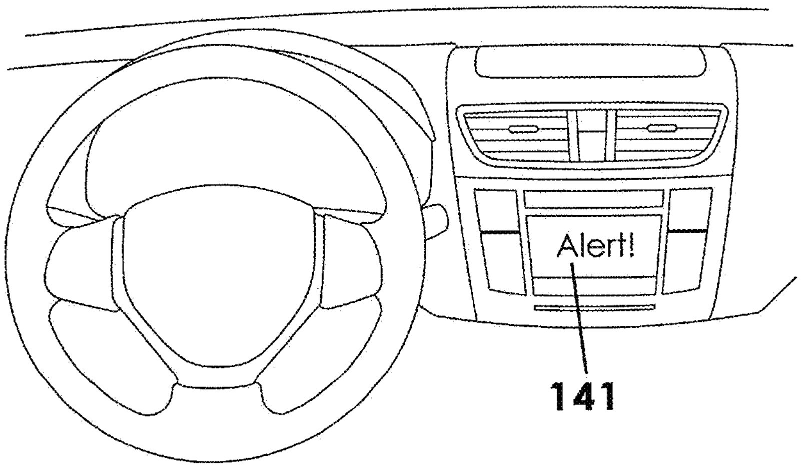
FIG. 10 is a front view of an automobile interior illustrated running a mobile application.

In another aspect, a mobile app 140 may be installed in the computer of an automobile that is configured to connect with the communications link 118 of the present system (FIG. 10). Specifically, an alert signal being communicated to the linear actuators 130 via the communications link 118 may include a corresponding alert message delivered to the mobile app 140. Preferably, the alert message may then be published on the display screen 141 that is becoming commonplace on the control center modules of automobiles. Further, the alert message may read "Alert Ahead," "Traffic Emergency Ahead," or the like. The mobile app 140 would be most beneficial when the present invention becomes commonly installed in highways throughout a county, state, or the country.

It is understood that while certain forms of this invention have been illustrated and described, it is not limited thereto except insofar as such limitations are included in the following claims and allowable functional equivalents thereof.

The invention claimed is:

1. A traffic alert system for notifying drivers of an emergency condition along a highway, comprising:

a processor;

a non-volatile memory in communication with said processor and configured to store (1) a plurality of identifiers and (2) alert data in data communication with said plurality of identifiers and that includes an alert location;

a communications link in data communication with said processor;

a plurality of speed control assemblies mounted in a ground surface beneath said highway, each speed control assembly being identified by a respective one of said plurality of identifiers, and said each speed control assembly including a speedbump portion that is movable between a retracted configuration coplanar with the highway and a raised 12 configuration that extends a predetermined distance above the highway;

wherein said processor, using said plurality of identifiers and said alert data, is configured to identify respective speed control assemblies that are located within a predetermined distance upstream of said alert location;

wherein said processor, using said communications link, is configured to actuate said identified speed control assemblies to said raised configuration.

2. The traffic alert system as in claim 1, wherein said plurality of identifiers are indicative of geographic locations of said plurality of speed control assemblies, respectively.

3. The traffic alert system as in claim 2, wherein said communications link is an internet connection connecting said processor to said plurality of speed control assemblies.

4. The traffic alert system as in claim 2, wherein said communications link includes a radio signal transmitter in data communication with said processor and a radio signal receiver in data communication with said plurality of speed control assemblies.

5. The traffic alert system as in claim 1, wherein said processor, is configured to actuate said identified speed control assemblies to move to incrementally larger raised configurations.

6. The traffic alert system as in claim 2, wherein said processor, using said plurality of identifiers and said alert data, is configured to determine upstream location data that is indicative of which respective speed control assembly is most upstream, next most upstream, and so on with respect to said alert location.

7. The traffic alert system as in claim 6, wherein said processor, using said upstream location data, is configured to actuate said most upstream speed control assembly to move to a first raised configuration, to actuate said next most upstream speed control assembly to a second raised configuration that is more raised than said first raised configuration, and so on.

8. The traffic alert system as in claim 7, wherein said plurality of speed control assemblies includes a first speed control assembly, a second speed control assembly positioned downstream from said first speed control assembly, and a third speed control assembly positioned downstream from said second speed control assembly.

9. The traffic alert system as in claim 1, wherein said each speed control assembly includes:

a linear actuator having an actuator rod that is movable between retracted and extended positions when energized; and a linkage having a scissor-shaped configuration that includes a pair of legs pivotally coupled to an end of said actuator rod that is configured to push a respective speedbump portion upwardly when that actuator rod is extended.

10. The traffic alert system as in claim 1, further comprising a mobile application in data communication with an automobile communication assembly and in data communication with said communication link, said mobile application being programmed to actuate, using said communications link, an audio or video device associated with said automobile communication assembly to emit indicia indicative of said alert data.

11. The traffic alert system as in claim 5, wherein said alert data includes a first deployment measurement and a second deployment measurement that is greater than said first deployment measurement and a third deployment measurement that is greater than said second deployment measurement such that said identified speed control assemblies are actuated to move to incrementally larger raised configurations, respectively.

12. A method for notifying drivers of an emergency condition along a highway, comprising:

mounting a plurality of speed control assemblies in a ground surface beneath said highway, each speed control assembly being identified by a respective one of a plurality of identifiers each identifier having a geographic component;

selectively moving a speedbump portion of each speed control assembly between a retracted configuration coplanar with the highway and a raised configuration that extends a predetermined distance above the highway;

receiving alert data regarding an alert location along the highway;

using said plurality of identifiers, identifying respective speed control assemblies that are located within a predetermined distance upstream of said alert location; and using a communications link, actuating said identified speed control assemblies to said raised configurations, respectively.

13. The method as in claim 12, further comprising actuating respective speedbump portions of said plurality of speed control assemblies to incrementally larger raised configurations.

14. The method as in claim 12, wherein said communications link is an internet connection connecting said processor to said plurality of speed control assemblies.

15. The method as in claim 12, wherein said communications link includes a radio signal transmitter in data communication with said processor and a radio signal receiver in data communication with said plurality of speed control assemblies.

16. The method as in claim 12, further comprising using said alert data and said plurality of identifiers to determine upstream location data that is indicative of which respective speed control assembly is most upstream with respect to said alert location, next most upstream with respect to said alert location, and so on.

17. The traffic alert system as in claim 16, further comprising using said upstream location data to actuate said most upstream speed control assembly to move to a first raised configuration, to actuate said next most upstream speed control assembly to a second raised configuration that is more raised than said first raised configuration, and so on.

18. The method as in claim 12, wherein said plurality of speed control assemblies includes a first speed control assembly, a second speed control assembly positioned downstream from said first speed control assembly, and a third speed control assembly positioned downstream from said second speed control assembly.

19. The method as in claim 18, wherein first, second, and third speed control assemblies are spaced apart from one another by at least 1,000 feet.

20. The method as in claim 12, further comprising providing mobile application software for installation on a communication assembly of an automobile that is configured for publishing said alert data.

21. The method as in claim 12, wherein said each speed control assembly comprises:

a linear actuator having an actuator rod that is movable between retracted and extended positions when energized; and a linkage having a scissor-shaped configuration that includes a pair of legs pivotally coupled to an end of said actuator rod that is configured to push a respective speedbump portion upwardly when the actuator rod is extended.

* * * * *